United States Patent [19]
Sampson

[11] Patent Number: 5,310,028
[45] Date of Patent: May 10, 1994

[54] S-CAM FOR DRUM BRAKE

[75] Inventor: Ernest C. Sampson, Bunnel, Fla.

[73] Assignee: Eaton Corporation, Cleveland, Ohio

[21] Appl. No.: 991,055

[22] Filed: Dec. 15, 1992

[51] Int. Cl.$^5$ .............................................. F16D 51/22
[52] U.S. Cl. ................... 188/329; 74/568 R
[58] Field of Search .............. 188/329, 330, 332, 338, 188/339, 324, 206 A; 192/78, 93 R; 74/568 R, 838

[56] References Cited

U.S. PATENT DOCUMENTS

| Re. 19,012 | 11/1933 | Poulet | 188/332 |
|---|---|---|---|
| 733,220 | 7/1903 | Krebs | 74/568 X |
| 1,742,843 | 1/1930 | Benedict | 74/568 |
| 4,445,597 | 5/1984 | Baltare | 188/206 A |
| 4,494,633 | 1/1985 | Idesawa | 188/329 |
| 4,905,800 | 3/1990 | Mathews | 188/329 |

FOREIGN PATENT DOCUMENTS

| 2401218 | 7/1975 | Fed. Rep. of Germany | 74/568 R |
|---|---|---|---|
| 639655 | 6/1928 | France | 188/329 |
| 396499 | 1/1974 | U.S.S.R. | 74/568 R |

Primary Examiner—Robert J. Oberleitner
Assistant Examiner—Peter M. Poon
Attorney, Agent, or Firm—L. J. Kasper; H. D. Gordon

[57] ABSTRACT

An S-cam assembly (33) is disclosed for expanding internal shoe brakes of the type comprising a pair of pivotally mounted brake shoes (17) located within a brake drum (11), each brake shoe carrying a cam follower (31). The assembly comprises an S-cam member (35) comprising a pair of substantially identical working portions (37), each working portion defining a working surface (39) and defining a nominal lift circle having a diameter D1. Each working portion includes a ramp member (43) pivotable about a pin (47) from a retracted position (FIG. 2) in which a ramp surface (51) is disposed within the nominal lift circle. Each ramp member has an extended position (FIG. 5) in which the ramp surface is disposed outward of the nominal lift circle and in engagement with the adjacent cam follower (31) and defining a larger lift circle having a diameter D2. The substantially increased reserve lift is accomplished without increasing the minimum installation diameter of the S-cam assembly.

14 Claims, 4 Drawing Sheets

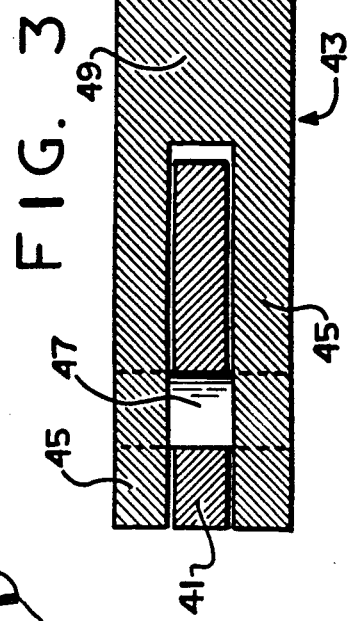
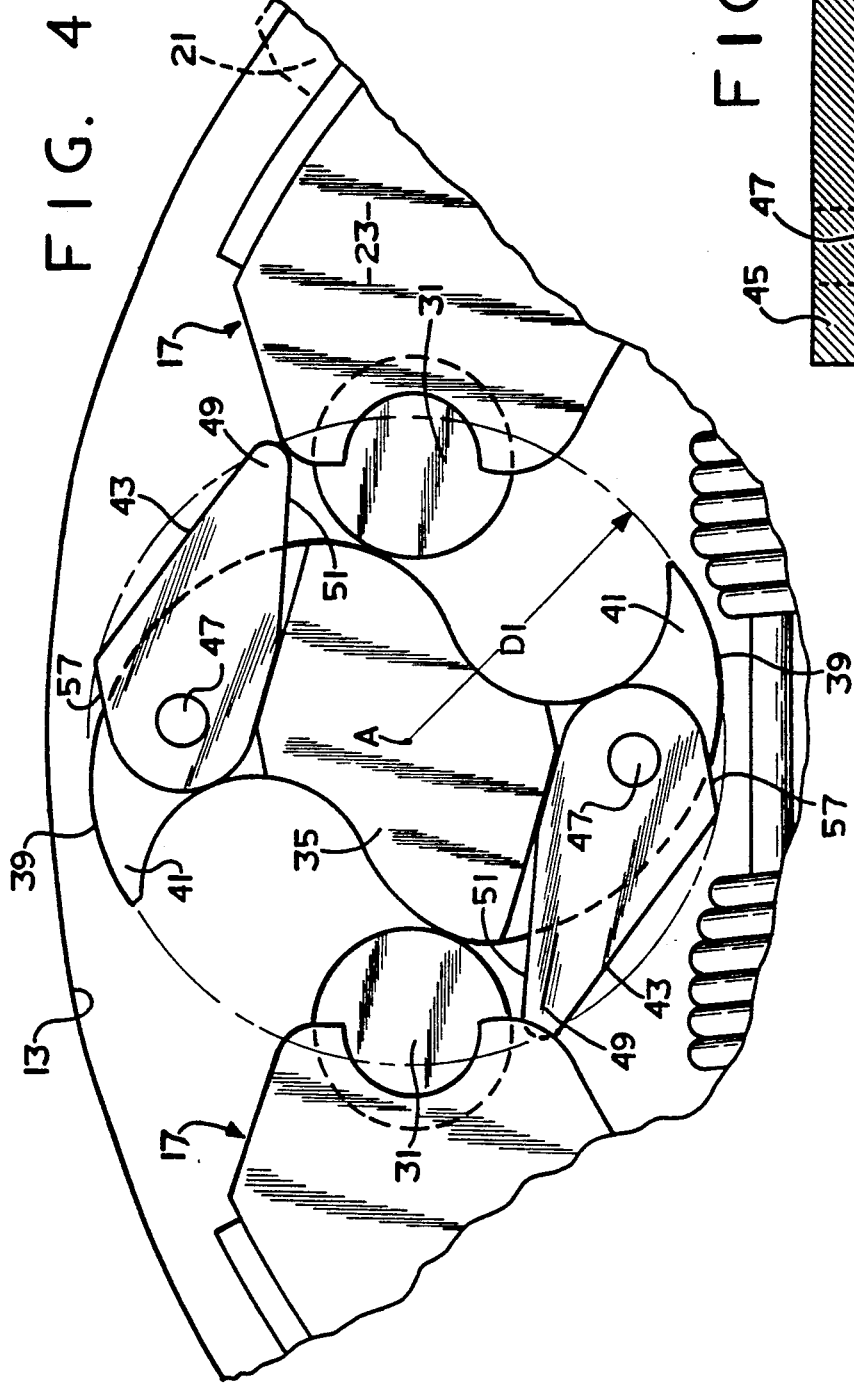

S-CAM FOR DRUM BRAKE

BACKGROUND OF THE DISCLOSURE

The present invention relates to rotary cam, expanding internal shoe drum brakes, and in particular, to an S-cam assembly having improved reserve lift capability and improved rollover protection.

Although the present invention is not strictly limited to rotary cam brakes of the S-cam type, but could be used with various other configurations of rotary cam brakes, the invention is especially advantageous when used with S-cam brakes, and will be described in connection therewith. S-cam expanding internal shoe drum brakes are well known in the prior art, as may be seen by reference to U.S. Pat. No. 4,905,800, assigned to the assignee of the present invention and incorporated herein by reference.

Although the conventional, prior art S-cam drum brakes have been commercially successful, those skilled in the art have continually attempted to increase lining wear between relinings. In general, increasing lining wear between relinings requires the use of thicker linings, which is generally satisfactory, but thicker linings require greater cam rise by the S-cam. Those skilled in the art have also attempted to improve the indication to the vehicle operator of the necessity of relining, and decrease the likelihood of cam flip (or rollover). It is believed that those skilled in the art are sufficiently familiar with cam flip, or rollover, and the causes thereof, such that no detailed explanation of the phenomenon is required. It is sufficient to note that, in the event of cam flip, or rollover, the cam would have rotated beyond its intended maximum rotary position, which would permit the brake shoes to move radially inward, out of engagement with the drum, such that no further braking action could occur.

In the above-incorporated U.S. Pat. No. 4,905,800, the working surfaces of the S-cam are provided at their ends with an extremely high rise/low mechanical advantage portion. After a substantial amount of lining wear, in order to move the brake shoes into engagement with the drum, sufficient rotation of the S-cam is necessary that the referenced high-rise, low mechanical advantage portions engage the cam followers, through which radially outward movement is imparted to the brake shoes, urging the brake shoes into engagement with the drums.

Although the improved S-cam of the referenced patent provides the vehicle operator with an indication (greater force required to rotate the S-cam), that the linings are worn, any such increase in "reserve lift" increases the overall diameter (minimum installation diameter) of the S-cam assembly. It is recognized by those skilled in the art that, in a typical installation, the amount of space between the brake shoe return spring and the inside diameter of the brake drum limits the ability to increase the reserve lift, utilizing any of the known prior art structures.

SUMMARY OF THE INVENTION

Accordingly, it is an object of the present invention to provide an improved S-cam assembly for expanding internal shoe drum brakes which can provide substantially increased reserve lift capability without increasing the "minimum installation diameter" of the cam assembly, or increasing substantially in any other way the space required for the S-cam assembly.

It is a related object of the present invention to provide an improved cam assembly which is operable through a substantially greater range of lining wear, while providing substantially improved rollover protection.

It is a further object of the present invention to provide an improved cam assembly which can be placed further from the axis of rotation of the brake drum, thus providing increased clearance between the cam assembly and the brake shoe return spring.

The above and other objects of the present invention are accomplished by the provision of an improved cam assembly for expanding internal shoe brakes of the type comprising a pair of pivotably mounted brake shoes located interiorly of a brake drum. Each of the brake shoes carries a cam follower urged into engagement with a cam member working surface, rotation of the cam assembly in a first direction of rotation from the fully disengaged condition forcing the brake shoes radially outwardly relative to the brake drum. The cam assembly comprises a cam member pivotable about an axis of rotation, the cam member comprising a pair of substantially identical working portions diametrically disposed about the axis of rotation. Each of the working portions defines one of the cam member working surfaces, and further defines a nominal lift circle having a diameter D1.

The improved cam assembly is characterized by each of the working portions including a ramp member movably fixed relative to the working portion. Each ramp member defines a ramp surface, and has a retracted position in which the ramp surface is disposed radially within the nominal lift circle. Each ramp member also has an extended position in which the ramp surface is disposed radially outward from the nominal lift circle and in engagement with one of the cam followers.

BRIEF DESCRIPTION OF THE DRAWINGS

FIG. 3 is a transverse cross-section taken on line 3—3 of FIG. 2.

FIG. 4 is similar to FIG. 2, and on the same scale, but with the S-cam assembly of the invention in a partially engaged condition.

DESCRIPTION OF THE PREFERRED EMBODIMENT

Figure 1:
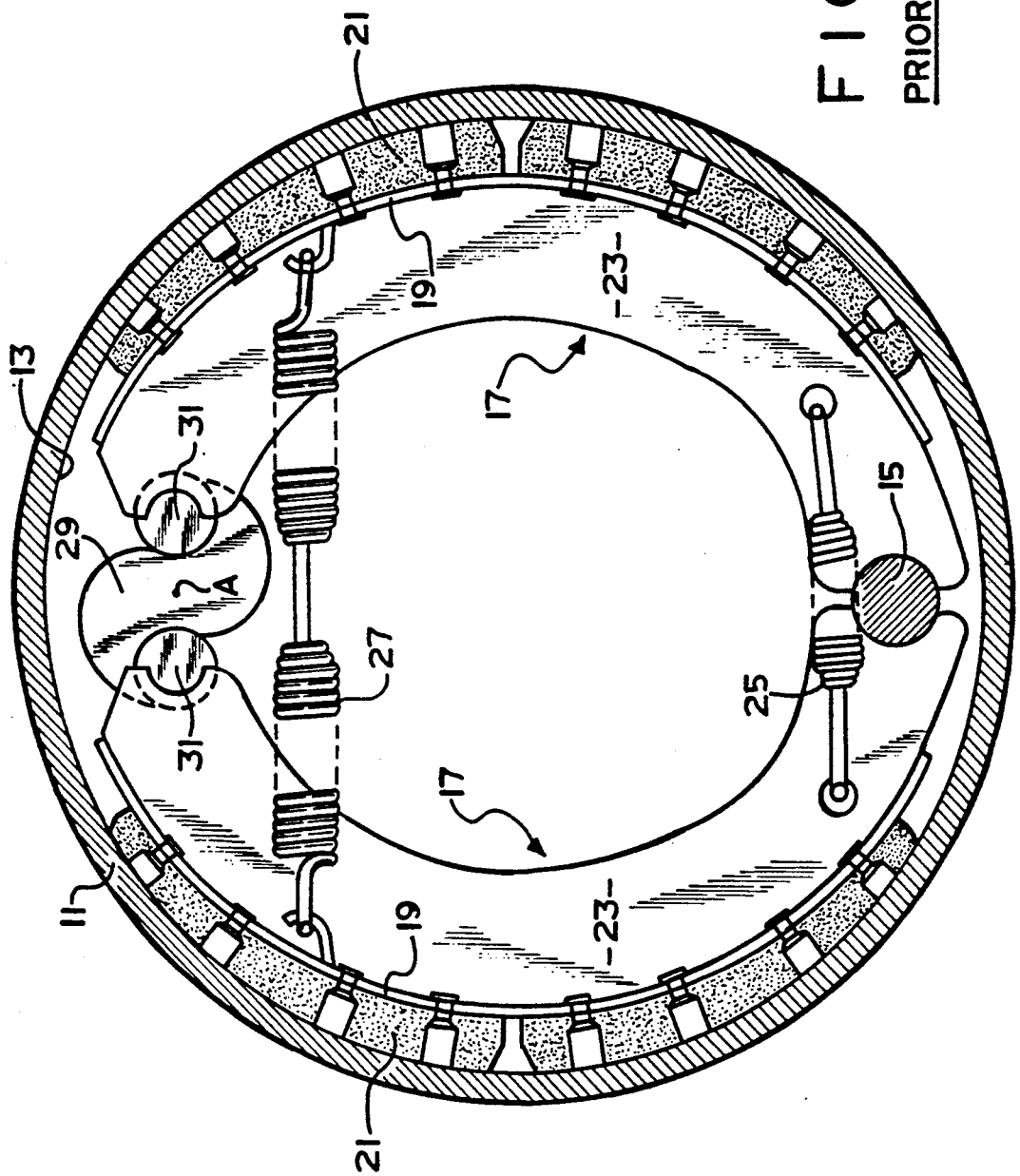
FIG. 1 is a plan view of the outboard side of a prior art S-cam expanding internal shoe drum brake.

Certain terminology will be used in the following description for convenience in reference only, and will not be limiting. Terms used hereinafter, such as "right" and "left", and "clockwise" and "counter-clockwise" will be understood to designate directions in the drawings to which reference is made. Terms such as "inwardly" and "outwardly" will refer to directions toward and away from, respectively, the axis of rotation of the device. The term "brakes" as used herein is intended to include various frictional coupling devices such as brakes, clutches, and the like.

Figure 2:
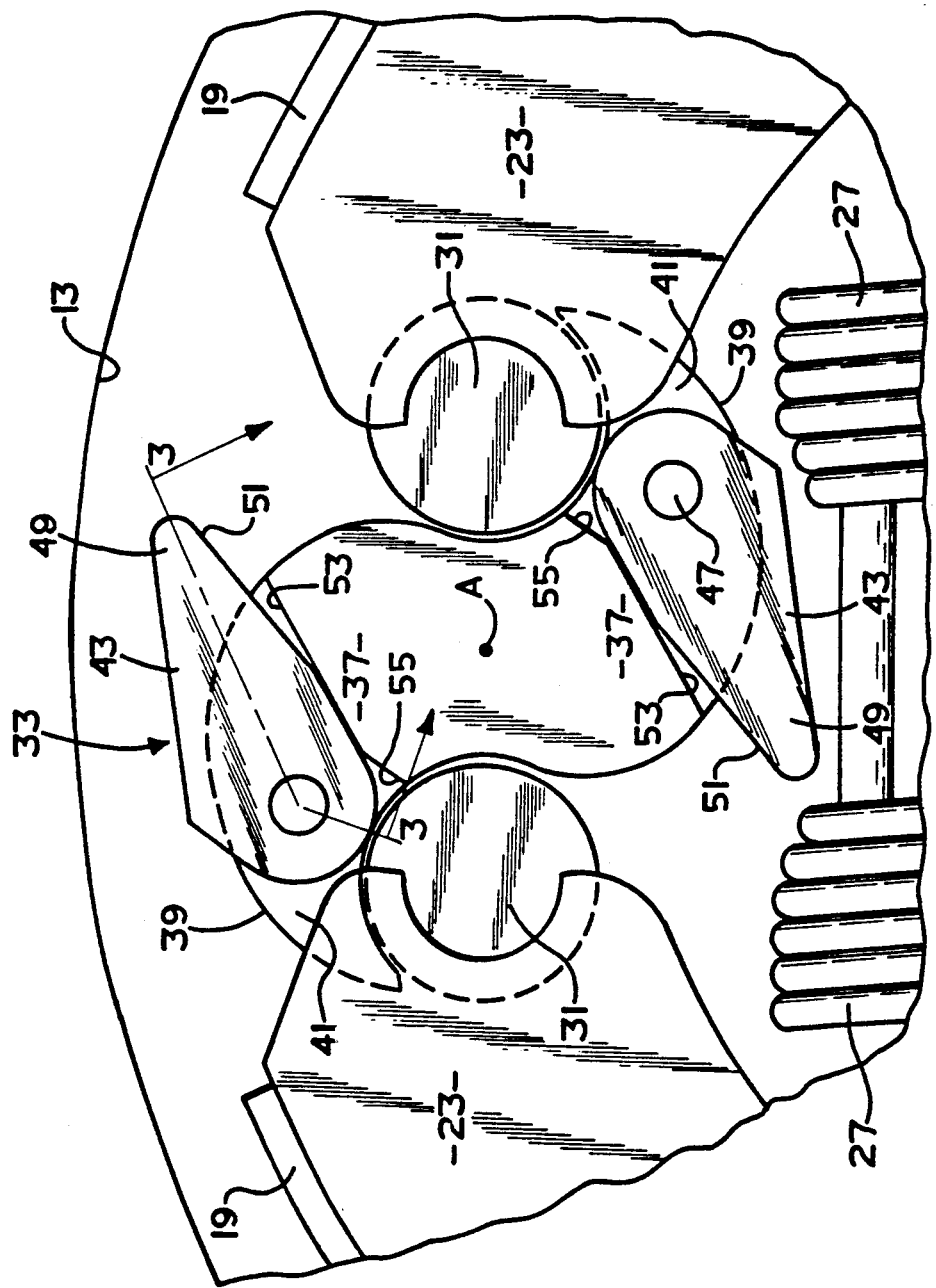
FIG. 2 is an enlarged, fragmentary view similar to FIG. 1, but illustrating the improved cam assembly of the present invention, in its fully disengaged condition.
Figure 5:
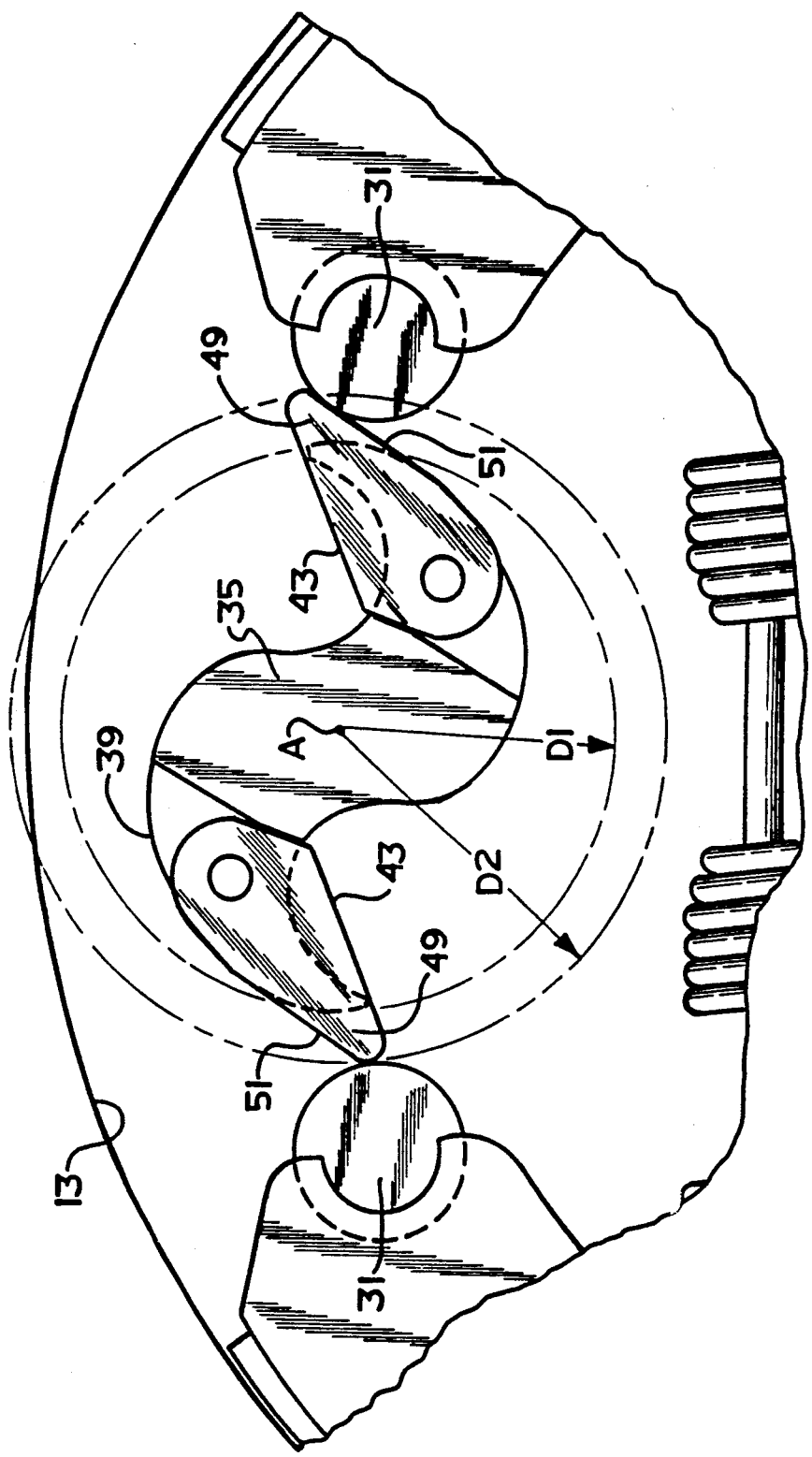
FIG. 5 is a view similar to FIG. 4, but on a smaller scale, and with the S-cam assembly of the present invention in a fully engaged condition.

By way of background, a typical prior art S-cam type expanding shoe drum brake assembly is illustrated in FIG. 1. The drum brake assembly comprises a generally rotatable drum 11 which is shown in transverse cross-section in FIG. 1. The drum 11 defines an internal drum surface 13, and for ease of illustration, only the drum surface 13 is shown in FIGS. 2, 4, and 5. A brake shoe pivot or anchor pin 15 is secured to a brake support spider (not shown herein), and a pair of substantially identical, opposed, generally arcuate brake shoes 17 is disposed in pivotal engagement with the anchor pin 15. Each of the brake shoes 17 includes a brake lining support or table 19, a brake lining 21 of suitable friction material, and one or more web members 23.

A brake shoe retaining spring 25 biases the adjacent, lower ends of the brake shoes 17 into engagement with the anchor pin 15, and a brake shoe return spring 27 biases the brake shoes 17 radially inwardly toward the normal, fully disengaged condition shown in FIG. 1.

The drum brake assembly includes an S-cam element 29 which, as is well known to those skilled in the art, is rotatable about its axis of rotation A. Such rotation causes generally radially outward pivotal movement of the brake shoes 17 about the anchor pin 15, thus causing frictional engagement of the brake linings 21 with the drum surface 13. Such engagement retards movement of the vehicle in a known manner. As the S-cam element 29 rotates from its position shown in FIG. 1, it engages a pair of substantially identical cam followers 31, which are rotatably supported, adjacent the upper ends of the brake shoes 17, and are preferably disposed axially between a pair of the web members 23. As is well known to those skilled in the art, clockwise rotation (in FIG. 1) of the S-cam element 29 would result in "cam rise", i.e., movement of the cam followers 31 in opposite directions from the axis A of cam element 29, in opposition to the biasing force of the return spring 27.

The S-cam element 29 is non-rotationally fixed to, or integral with, a cam shaft (not shown) which is mounted for rotation with a brake actuator (also not shown). The general construction and operation of the actuation mechanism for the S-cam element 29 are generally well known to those skilled in the art, are not an essential part of the invention, and will not be described further herein. It should be understood that, as used herein, the term "disengaged condition" means a position of the S-cam assembly in which the brake shoes 17 are either out of engagement with the drum surface 13, or in engagement with the drum surface 13, but with insufficient force being applied to accomplish braking. Conversely, the term "engaged condition" refers to the S-cam assembly being in such a position that braking is accomplished.

Referring now primarily to FIG. 2, the improved S-cam assembly of the present invention, generally designated 33, will be described in detail. The assembly 33 includes an S-cam member 35, which is also rotatable about an axis of rotation A. The S-cam member 35 may be substantially identical to the prior art S-cam element 29, except as will be described subsequently. The S-cam member 35 comprises a pair of substantially identical working portions 37, oppositely disposed about the axis of rotation A. Each working portion 37 defines a working surface 39. Each of the working surfaces 39 is disposed to engage the adjacent cam follower 31, as the S-cam member 35 rotates clockwise from its fully disengaged condition shown in FIG. 2. In FIG. 2, a slight gap is shown between each of the cam followers 31 and the adjacent surface of the cam member 35, primarily for better illustration of the parts, although in actual use, no such gap would be present. As is well known to those skilled in the art, each working surface 39 preferably comprises a portion of an involute spiral, such that rotation of the S-cam member 35 will result in a substantially constant "rise rate", i.e., the linear movement of the center of the cam follower 31, relative to the axis of rotation A, per degree of rotation of the S-cam member 35. As is also well known in to those skilled in the art, the typical S-cam member has a working surface configured to provide a relatively low rate of lift during at least the first sixty or one hundred degrees of rotation of the S-cam member.

Referring now to FIG. 3, in conjunction with FIG. 2, the difference between the S-cam assembly 33 of the present invention and the typical prior art S-cam element 29 will be described. The S-cam member 35 may have the same axial dimension (measured in a direction perpendicular to the plane of FIG. 2), as the prior art S-cam element 29, over the radially inward part of each of the portions 37. However, in accordance with the present invention, each of the working portions 37 has, toward its radially outer extent, a portion thereof on either axial end removed, leaving only a central, terminal portion 41. As may be seen in FIG. 2, the working surface 39 continues, uninterrupted, but narrower in the axial direction, along the terminal portion 41.

Disposed in engagement with each of the terminal portions 41 is a generally U-shaped ramp member 43. Each ramp member 43 includes a pair of axially spaced-apart legs 45, disposed on axially opposite sides of the terminal portion 41, and closely spaced apart relative thereto.

In the subject embodiment, and by way of example only, each ramp member 43 is pivotably mounted relative to the terminal portion 41 by means of a pin member 47, which may be press-fit into an opening in the terminal portion 41, and loosely received in openings in each of the legs 45, or vice-versa. Although, in the subject embodiment, each of the ramp members 43 is illustrated and described as being pivotable relative to its respective terminal portion 41, it should be understood that the invention is not so limited. By way of example only, the ramp members could be radially retractable relative to the S-cam member 35, although, in such an embodiment, it would then be necessary to provide a mechanism for extending radially each of the ramp members in response to rotation of the S-cam member beyond a predetermined angular orientation.

The spaced-apart legs 45 come together at a radially outer, solid portion 49. The solid portion 49 defines a ramp surface 51, and in the subject embodiment, with each of the ramp members 43 being pivotable, each ramp surface 51 "faces" the particular cam follower 31, which the ramp surface will engage, upon clockwise rotation of the S-cam member 35, from the fully disengaged position shown in FIG. 2.

Referring still primarily to FIG. 2, the process of cutting away each axial end of the working portion 37 to form the terminal portion 41 results in the formation of a shoulder surface 53 on each axial end of the S-cam member 35. In the subject embodiment, each shoulder surface 53 lies end-to-end with a stop surface 55, the function of which will be described subsequently.

Referring now primarily to FIG. 4, the S-cam assembly 33 of the present invention is illustrated in a partially engaged condition, i.e., the S-cam member 35 has been rotated clockwise, from the fully disengaged condition shown in FIG. 2, about 55 degrees. As will be understood by those skilled in the art, the "partially engaged condition" shown in FIG. 4 would typically constitute a fully engaged condition prior to any wear of the brake linings 21. However, because one of the purposes of the present invention is to provide for rollover protection after substantial wear of the brake linings, the operational conditions illustrated in FIGS. 4 and 5 will be described in connection with the assumption that substantial wear of the brake linings 21 has occurred, although the full brake lining is shown in FIG. 4, extending radially outwardly beyond the drum surface 13 (an impossible condition), simply to illustrate the point mentioned above.

In the partially engaged condition shown in FIG. 4, the S-cam member 35 has been rotated to a position which has already resulted in substantially radial outward movement of each of the brake shoes 17. However, in this partially engaged condition, each of the ramp members 43 is still disposed in its retracted position, the same as shown in FIG. 2, relative to its respective terminal portion 41. With continued rotation in the clockwise direction of the S-cam member 35, each outer, solid portion 49 of the ramp member 43 begins to pass axially between the web members 23, which support each cam follower 31.

As the S-cam member 35 continues its rotation, the ramp surface 51 engages the adjacent cam follower 31, and continued rotation of the S-cam member 35 results in pivotal movement of each of the ramp members 43, in a counter-clockwise direction, about the axis of the pin member 47. However, it should be understood that in the partially engaged position in FIG. 4, and for a number of degrees of rotation of the S-cam member 35 thereafter, rise of the cam followers 31 is still occurring in response to the rise of the working surface 39. The counter-clockwise rotation of each of the ramp members 43 is merely moving it toward a position in which it can perform its intended function.

As the S-cam member 35 continues its clockwise rotation, from the position shown in FIG. 4, toward the position shown in FIG. 5, there is a point at which each of the cam followers 31 ceases its engagement with the working surface 39, and thereafter engages only the ramp surface 51. At the point in time at which each of the cam followers 31 begins to contact only the ramp surface 51, the "cam rise" or "rate of lift" is thereafter determined by the orientation of the ramp surface 51. Referring again briefly to FIG. 4, each of the ramp members 43 includes a stop surface 57 which, when the ramp member 43 is in the retracted position of FIG. 4, faces generally radially outwardly. However, after each of the ramp members 43 begins to move from its retracted position toward its extended position, as shown in FIG. 5, the ramp member 43 eventually pivots in the counter-clockwise direction about the pin 47 to a position in which the stop surface 57 on the ramp member engages the adjacent stop surface 55 on the S-cam member 35, as is shown in FIG. 5.

Several of the primary advantages of the present invention are illustrated in FIG. 5, to which reference will now be made. The radially outermost extent of the working portions 37 of the S-cam member 35 define a nominal lift circle, as the S-cam member 35 rotates. By "nominal lift circle", it is meant a lift circle which would be defined by the S-cam member 35, alone, without the ramp members 43 of the present invention. As may best be seen in FIG. 5, the nominal lift circle has a diameter D1. Prior art attempts to increase cam lift, such as the teachings of above-incorporated U.S. Pat. No. 4,905,800, have typically added only several thousandths of an inch to the cam lift. However, when the ramp members 43 of the present invention reach the fully-extended position shown in FIG. 5, the radially outer ends of the solid portions 49 define a maximum lift circle as the S-cam member 35 rotates. The maximum lift circle has a diameter D2, and by comparing the diameter D2 to the diameter D1, it may be seen that the present invention substantially increases the total lift capability of the S-cam assembly 33. However, in accordance with one of the objectives of the present invention, this increased lift (reserved lift) capability occurs without any increase in the "minimum installation diameter" of the assembly 33. Referring briefly back to FIG. 4, it may be seen that, with the ramp members 43 in their retracted position, each ramp member lies wholly within the nominal lift circle, having the diameter D1.

Referring again to FIG. 5, it should also be apparent that the increased cam lift (reserve lift) capability provided by the present invention makes it possible for the S-cam assembly 33 of the invention to operate through a substantially greater range of lining wear than was possible with the prior art S-cam devices. Theoretically, the additional range of lining wear which is possible with the present invention can be determined directly as a function of the difference between the diameter D2 and the diameter D1. Alternatively, a certain portion of the difference between the diameters D2 and D1 can be "applied" toward additional lining wear, with the remainder being applied toward a somewhat greater safety margin against rollover. In either case, the benefits of the invention are substantial.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A cam assembly for expanding internal shoe brakes of the type comprising a pair of pivotably mounted brake shoes located interiorly of a brake drum, each of said brake shoes carrying a cam follower urged into direct engagement with a cam member working surface, rotation of said cam assembly in a first direction of rotation from the fully disengaged condition forcing at least one of said brake shoes radially outwardly relative to said brake drum; said cam assembly comprising a cam member pivotable about an axis of rotation (A), said cam member comprising a working portion, said working portion defining said working surface and further defining a nominal lift circle having a first diameter (D1), characterized by:

(a) said working portion including a ramp member movably fixed relative thereto;
  (b) said ramp member defining a ramp surface and having a retracted position in which said ramp surface is disposed radially within said nominal lift circle thereby said ramp surface being out of engagement with said cam follower; and
  (c) said ramp member having an extended position in which said ramp surface is disposed radially outward from said nominal lift circle, and in direct engagement with its respective cam follower.

2. A cam assembly as claimed in claim 1, characterized by said ramp member remaining in said retracted position as said cam assembly rotates in said first direction from said fully disengaged condition to a partially engaged condition.

3. A cam assembly as claimed in claim 2, characterized by said ramp member moving from said retracted position to said extended position as said cam assembly rotates in said first direction from said partially engaged condition to a fully engaged condition.

4. A cam assembly as claimed in claim 3, characterized by said ramp member including a radially outer terminal portion when said ramp member is in said extended position, said terminal portion defining a maximum lift circle having a second diameter (D2), said second diameter (D2) being substantially greater than said first diameter (D1).

5. A cam assembly as claimed in claim 1, characterized by said ramp member being pivotally mounted to said cam member, and being pivotable from said retracted position, to said extended position.

6. A cam assembly as claimed in claim 5, characterized by said ramp member, in said retracted position, being disposed such that, as said cam member rotates from said partially engaged condition to said fully engaged condition, said ramp surface of said ramp member engages said cam follower, and with continued rotation of said cam member in said first direction, said cam follower moves said ramp member from said retracted position to said extended position.

7. A cam assembly as claimed in claim 1, characterized by said working surface defining a portion of an involute spiral, whereby rotation of said cam member results in a substantially constant rise rate of said cam follower.

8. An S-cam assembly for expanding internal show brakes of the type comprising a pair of pivotally mounted brake shoes located interiorly of a brake drum, each of said brake shoes carrying a cam follower urged into direct engagement with a cam member working surface, rotation of said S-cam assembly in a first direction of rotation from the fully disengaged condition forcing said brake shoes radially outwardly relative to said brake drum; said S-cam assembly comprising an S-cam member pivotable about an axis of rotation (A), said S-cam member comprising a pair of substantially identical working portions diametrically disposed about said axis of rotation (A), each of said working portions defining said working surface and further defining a nominal lift circle having a first diameter (D1), characterized by:

(a) each of said working portions including a ramp member movably fixed relative thereto;

(b) each ramp member defining a ramp surface and having a retracted position in which said ramp surface is disposed radially within said nominal lift circle thereby said ramp surface being out of engagement with said cam follower; and (c) each ramp member having an extended position in which said ramp surface is disposed radially outward from said nominal lift circle, and in direct engagement with one of said cam followers.

9. An S-cam assembly as claimed in claim 8, characterized by each of said ramp members remaining in said retracted position as said S-cam assembly rotates in said first direction from said fully disengaged condition to a partially engaged condition.

10. An S-cam assembly as claimed in claim 9, characterized by each of said ramp members moving from said retracted position to said extended position as said S-cam assembly rotates in said first direction from said partially engaged condition to a fully engaged condition.

11. An S-cam assembly as claimed in claim 10, characterized by each of said ramp members including a radially outer terminal portion when said ramp member is in said extended position, said terminal portion defining a maximum lift circle having a second diameter (D2), said second diameter (D2) being substantially greater than said first diameter (D1).

12. An S-cam assembly as claimed in claim 8, characterized by each of said ramp members being pivotably mounted to said S-cam member, and being pivotable from said retracted position, to said extended position.

13. An S-cam assembly as claimed in claim 12, characterized by each of said ramp members, in said retracted position, being disposed such that, as said S-cam member rotates from said partially engaged condition to said fully engaged condition, said ramp surface of said ramp member engages said cam follower, and with continued rotation of said S-cam member in said first direction, said cam follower moves said ramp member from said retracted position to said extended position.

14. An S-cam assembly as claimed in claim 8, characterized by each of said working surfaces comprising a portion of an involute spiral, whereby rotation of said S-cam member results in a substantially constant rise rate of each of said cam followers.

* * * * *